Dec. 30, 1924.
G. MRABUENO
KNIFE
Filed March 18, 1924
1,521,311
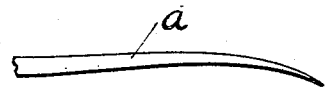
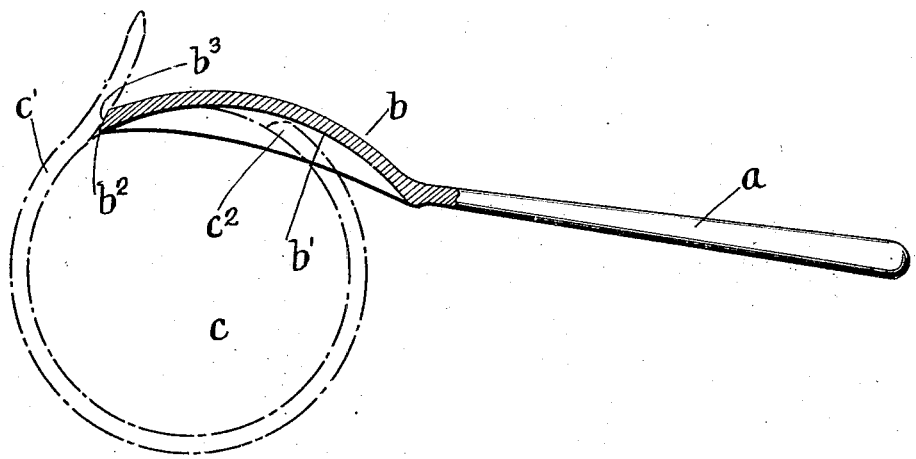
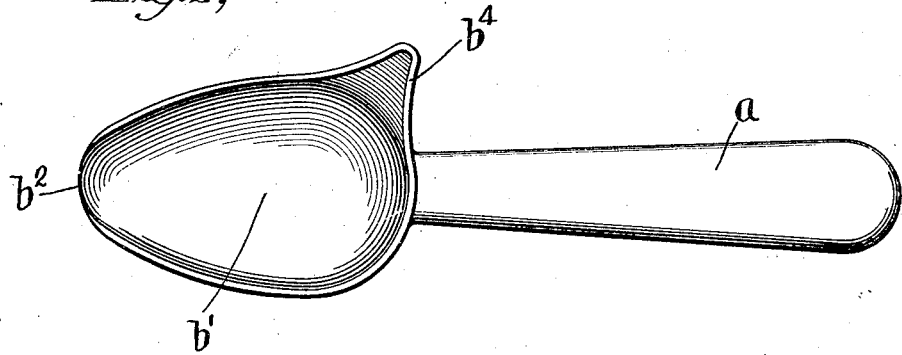
Inventor
Gregorio Mrabueno
By his Attorneys
Redding, Greeley, O'Shea and Campbell Patented Dec. 30, 1924.

1,521,311

UNITED STATES PATENT OFFICE.

GREGORIO MRABUENO, OF NEW YORK, N. Y.

KNIFE.

Application filed March 18, 1924. Serial No. 700,181.

*To all whom it may concern:*

Be it known that I, GREGORIO MRABUENO, a citizen of the United States, residing in the borough of Manhattan of the city and State of New York, have invented certain new and useful Improvements in Knives, of which the following is a specification, reference being had to the accompanying drawing, forming a part hereof.

This invention relates to knives and more particularly to knives adapted to remove the skin or peel from citrus fruits. It is the common experience of everyone having to do with the peeling of citrus fruits that the removal of the peel is accompanied by difficulties and in any circumstance is a laborious undertaking since the peel must be practically pried away from the pulp and comes away in pieces of unequal size. Moreover, great care must be taken not to break the thin membranous inner covering which surrounds the pulp. For this reason, a sharp knife cannot be used and resort is generally had to the fingers which, while possibly satisfactory for the individual, does not meet with present day views of sanitation. In hotels, clubs and other establishments where great numbers of oranges, for instance, must be peeled the time involved in peeling the fruit is considerable and supervision of the cleanliness of the help employed in this undertaking is difficult. It is an object of the present invention to provide a device, for convenience sake termed a knife, which will facilitate the removal of the peel from all kinds of citrus fruits such as oranges and grape fruit without damage to the pulp whereby the same may be served in a pleasing and cleanly manner. Accordingly a knife is provided having a blade formed with one side generally concave and of substantially spherical surface to conform more or less to the surface of the fruit, the cutting edge being preferably blunt or of only that degree of sharpness necessary to permit its being forced through the yielding skin of the fruit. For convenience in manipulation the knife may be provided, adjacent the point where the blade and handle meet, with a rest for the thumb in order to permit the user thereof to apply, in a convenient manner the desired degree of pressure during the operation of peeling. A further object of the invention is to incorporate with the knife means for removing the pulp in a convenient and unmutilated condition from a citrus fruit which has been cut in half. To this end the handle may be formed relatively thin and flat, tapering towards its end and slightly curved to conform to the configuration of the fruit whereby it may be inserted between the pulp and the peel to scoop out the pulp. It is also an object of the invention to provide a device which can be readily and cheaply manufactured. To this end the knife may be stamped out of a single piece of material in one operation. The invention will now be described more specifically in connection with the accompanying drawing illustrating a preferred embodiment thereof. In the drawing:

Figure 1 is a view partly in section of the knife according to the present invention and showing the manner of its use.

Figure 2 is a view showing the knife in plan.

Figure 3 is a fragmentary view showing a modification of the handle to the end that it may be used to scoop out the pulp from a citrus fruit which has been cut in half.

The handle of the knife is indicated at $a$ and the blade at $b$. While in the illustrated embodiment these two portions are shown as parts of a unitary structure, it will be understood that the blade and handle may be formed separately of the same or different materials and secured in operative relation in any usual or convenient manner. The handle $a$ may take any form which will offer a convenient grip for the hand. The side of the blade adapted to contact with the fruit in peeling is concave as illustrated at $b'$. It is preferred that this concave surface be a spherical one in order to conform more nearly to the surface of the fruit. The edge of the blade opposite to that portion which joins the handle and indicated at $b^2$ is termed the cutting edge and while fairly thin is not sharpened as in a knife, but on the contrary is only sharp enough to permit the knife to be easily forced through the peel.

The operation of the device will be apparent from the foregoing description. In Figure 1 a spherical citrus fruit such as an orange or grape fruit, indicated at $c$, is held in one hand (say the left) and the knife in the other (say the right). The peel is indicated at $c'$. The knife is forced in the axial direction thereof through the skin as at $c^2$ and is thereafter worked along under the skin with a kind of wedging action to pry the skin away from the fruit. To facilitate the deflection of the peel the cutting end of the blade may be formed with a bevel as at $b^3$ (Figure 1). To permit the manipulation to conveniently apply some pressure during the removal of the peel and at the same time enable him to guide the knife so as not to break off a piece of the peel or injure the covering of the pulp a thumb rest $b^4$ is formed at one side of the blade at the point where the handle and blade join. The knife has been illustrated as adapted for use by a right handed person but it will be understood that it may be easily adapted for use in the left hand by forming the thumb rest on the opposite side of the handle.

It is sometimes desirable to remove the pulp from the peel without retaining the pulp in an unbroken spherical form. In this instance, the fruit may be cut in half in the ordinary manner and the pulp scooped out of each half. The handle may be conveniently formed to facilitate this scooping operation by forming the handle relatively thin, broad and tapering towards its end with a slight curve to conform readily to the hemispherical interior of the peel. The operative end of such a handle is shown in side elevation in Figure 3.

It will thus be seen that a device has been provided which is not only simple and easy to manufacture but extremely effective for the purpose in hand it having been found by experience that with such a knife six boxes of oranges can be peeled in one hour whereas with the usual method of stripping the peel with the fingers not more than one box of oranges could be peeled in the same length of time. Moreover, when the device is provided with a tapering curved handle the removal of the pulp from each half of a citrus fruit which has been cut in half is greatly facilitated.

Various modifications may be made in the form and configuration of the device and no limitation is intended except as indicated in the appended claims.

What I claim is:—

1. As an article of manufacture, a knife for peeling citrus fruits comprising, in combination, a handle, a blade having a concave substantially spherical surface the edge of said blade being formed substantially opposite the juncture of the blade and handle as a wedge shaped cutting edge and said blade being formed of increasing thickness rearwardly to form an abutment for a thumb rest adjacent the point of connection with the handle.

2. As an article of manufacture, a knife for peeling citrus fruits comprising, in combination, a thin flat tapering and curved handle, a blade having a concave substantially spherical surface, the edge of said blade being formed substantially diametrically opposite the point of connection of the blade with the handle as a wedge shaped cutting edge and said blade being formed with a thumb rest at the juncture of the blade and handle.

This specification signed this 5th day of March A. D. 1924.

GREGORIO MRABUENO.